United States Patent
Lee et al.

(10) Patent No.: US 10,990,765 B2
(45) Date of Patent: *Apr. 27, 2021

(54) SENTENCE GENERATING METHOD AND APPARATUS

(71) Applicant: Samsung Electronics Co., Ltd., Suwon-si (KR)

(72) Inventors: Jihyun Lee, Suwon-si (KR); Hoshik Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/745,947

(22) Filed: Jan. 17, 2020

(65) Prior Publication Data
US 2020/0175233 A1 Jun. 4, 2020

Related U.S. Application Data

(63) Continuation of application No. 15/945,979, filed on Apr. 5, 2018, now Pat. No. 10,572,604.

(30) Foreign Application Priority Data

Sep. 25, 2017 (KR) .................. 10-2017-0123569

(51) Int. Cl.
*G06F 17/28* (2006.01)
*G06F 17/20* (2006.01)
(Continued)

(52) U.S. Cl.
CPC ............ *G06F 40/47* (2020.01); *G06F 40/242* (2020.01); *G06F 40/247* (2020.01); *G06F 40/30* (2020.01); *G06F 40/44* (2020.01); *G06F 40/56* (2020.01)

(58) Field of Classification Search
CPC ............ G06F 17/2735; G06F 17/2785; G06F 17/2795; G06F 17/2818; G06F 17/2836;
(Continued)

(56) References Cited

U.S. PATENT DOCUMENTS 5,966,686 A * 10/1999 Heidorn ................ G06F 40/253
704/9
5,991,710 A * 11/1999 Papineni ................ G06F 40/44
704/2

(Continued)

FOREIGN PATENT DOCUMENTS

JP 2003-29779 A 1/2003
JP 2011-243087 A 12/2011
(Continued)

OTHER PUBLICATIONS

Josef Och, Franz et al., "Discriminative Training and Maximum Entropy Models for Statistical Machine Translation", *Proceedings of the 40th annual meeting on association for computational linguistics*, Philadelphia, Pennsylvania—Jul. 7-12, 2002 (pp. 295-302).

(Continued)

*Primary Examiner* — Khai N. Nguyen
(74) *Attorney, Agent, or Firm* — NSIP Law

(57) ABSTRACT

A sentence generating method includes: generating a corresponding word set of a source word set generated based on a source sentence; generating words by performing decoding based on feature vectors generated through encoding of the source sentence; adjusting a probability of at least one of the generated words based either one or both of the source word set and the corresponding word set; and selecting character strings from different character strings including each of the generated words based on the adjusted probability and the probability as unadjusted.

22 Claims, 9 Drawing Sheets

(51) Int. Cl.
*G06F 40/47* (2020.01)
*G06F 40/30* (2020.01)
*G06F 40/44* (2020.01)
*G06F 40/56* (2020.01)
*G06F 40/242* (2020.01)
*G06F 40/247* (2020.01)

(58) Field of Classification Search
CPC .. G06F 17/2881; G06F 40/242; G06F 40/247; G06F 40/30; G06F 40/44; G06F 40/47; G06F 40/56
USPC ........................................ 704/2, 4, 240, 251
See application file for complete search history.

(56) References Cited

U.S. PATENT DOCUMENTS

| | | | | |
|---|---|---|---|---|
| 5,995,922 A * | 11/1999 | Penteroudakis | .... | G06F 16/3335 704/9 |
| 6,651,220 B1 * | 11/2003 | Penteroudakis | .... | G06F 16/3335 715/236 |
| 8,341,096 B2 * | 12/2012 | Fisher | ............... | G06F 16/90344 706/12 |
| 8,352,245 B1 * | 1/2013 | Lloyd | ...................... | G10L 25/51 704/9 |
| 8,612,203 B2 * | 12/2013 | Foster | ..................... | G06F 40/45 704/2 |
| 8,756,499 B1 * | 6/2014 | Kataoka | .............. | G06F 3/04883 715/259 |
| 8,775,155 B2 * | 7/2014 | Roth | ....................... | G06F 40/51 704/2 |
| 9,047,268 B2 * | 6/2015 | Ouyang | .............. | G06F 3/04886 |
| 9,208,448 B2 * | 12/2015 | Fisher | .................... | G06N 20/00 |
| 9,552,355 B2 * | 1/2017 | Dymetman | ............. | G06F 40/44 |
| 10,255,275 B2 * | 4/2019 | Song | ........................ | G06F 40/205 |
| 10,380,264 B2 * | 8/2019 | Lee | ........................ | G06F 40/268 |
| 10,402,495 B1 * | 9/2019 | Rush | ..................... | G10L 15/197 |
| 10,402,734 B2 * | 9/2019 | Deselaers | ......... | G06K 9/00402 |
| 10,572,604 B2 * | 2/2020 | Lee | ........................ | G06F 40/30 |
| 2005/0021323 A1 | 1/2005 | Li | | |
| 2007/0011132 A1 * | 1/2007 | Zhou | ..................... | G06F 16/951 |
| 2008/0109209 A1 * | 5/2008 | Fraser | ..................... | G06F 40/45 704/4 |
| 2008/0162111 A1 | 7/2008 | Bangalore et al. | | |
| 2008/0208597 A1 * | 8/2008 | Chino | ................. | G10L 15/1822 704/277 |
| 2008/0306729 A1 * | 12/2008 | Drissi | .................... | G06F 16/319 704/8 |
| 2009/0228263 A1 * | 9/2009 | Kamatani | ............... | G06F 40/42 704/4 |
| 2011/0131156 A1 * | 6/2011 | Fisher | ............... | G06F 16/90344 706/12 |
| 2011/0202484 A1 * | 8/2011 | Anerousis | ............. | G06N 7/005 706/12 |
| 2011/0288852 A1 * | 11/2011 | Dymetman | ............. | G06F 40/45 704/4 |
| 2013/0013311 A1 * | 1/2013 | Zheng | .................... | G10L 15/197 704/257 |
| 2013/0124492 A1 * | 5/2013 | Gao | ........................ | G06F 40/44 707/706 |
| 2013/0138586 A1 * | 5/2013 | Jung | ...................... | G06N 20/00 706/12 |
| 2014/0149323 A1 * | 5/2014 | Fisher | .................... | G06N 20/00 706/12 |
| 2016/0117316 A1 * | 4/2016 | Le | ............................ | G06F 7/10 704/9 |
| 2017/0031899 A1 | 2/2017 | Lee et al. | | |
| 2017/0060855 A1 * | 3/2017 | Song | ....................... | G06F 40/55 |
| 2017/0323203 A1 * | 11/2017 | Matusov | ................. | G06F 16/30 |
| 2017/0372696 A1 * | 12/2017 | Lee | ......................... | G10L 15/16 |
| 2018/0011843 A1 * | 1/2018 | Lee | ......................... | G06F 40/51 |
| 2018/0046618 A1 * | 2/2018 | Lee | ......................... | G06F 40/53 |
| 2018/0052829 A1 * | 2/2018 | Lee | ......................... | G06F 40/268 |
| 2019/0095433 A1 * | 3/2019 | Lee | ......................... | G06F 40/44 |
| 2020/0175233 A1 * | 6/2020 | Lee | ......................... | G06F 40/44 |

FOREIGN PATENT DOCUMENTS

| | | |
|---|---|---|
| KR | 10-2012-0077800 A | 7/2012 |
| KR | 10-2016-0009916 A | 1/2016 |

OTHER PUBLICATIONS

Li, Jiwei, et al., "Mutual Information and Diverse Decoding Improve Neural Machine Translation," Computation and Language; Artificial Intelligence, arXiv preprint arXiv:1601.00372, Jan. 2016, (10 pages in English).

Extended European Search Report dated Feb. 20, 2019 in counterpart European Application No. 18187748.1 (9 pages in English).

* cited by examiner

FIG. 7

First candidate character string : I'd like to let you know that your invention related to the duties was filed.

Second candidate character string : I'd like to inform you that your work have been applied.

Third candidate character string : I'd like to let you know that your work has been set out.

| Corresponding word set | Coverage for first candidate character string | Coverage for second candidate character string | Coverage for third candidate character string |
|---|---|---|---|
| your | ○ | | ○ |
| invention related to the duties | ○ | | |
| was filed<br>was applied<br>have been applied | ○ | ○ | |
| let you know<br>inform you<br>notify you | ○ | ○ | ○ |

221

710 — your
720 — invention related to the duties
730 — was filed / was applied / have been applied
740 — let you know / inform you / notify you

SENTENCE GENERATING METHOD AND APPARATUS

CROSS-REFERENCE TO RELATED APPLICATIONS

This application is a continuation of U.S. patent application Ser. No. 15/945,979 filed on Apr. 5, 2018, now U.S. Pat. No. 10,572,604, which claims the benefit under 35 USC § 119(a) of Korean Patent Application No. 10-2017-0123569 filed on Sep. 25, 2017, in the Korean Intellectual Property Office, the entire disclosure of which is incorporated herein by reference for all purposes.

BACKGROUND

1. Field

The following description relates to a sentence generating method and apparatus.

2. Description of Related Art

A user may translate a sentence, a paragraph, a phrase, or a word in a language different from a native language of the user using machine translation. A result of the machine translation may directly affect user understanding, and thus research has been actively conducted to improve accuracy in machine translations.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a sentence generating method includes: generating a corresponding word set of a source word set generated based on a source sentence; generating words by performing decoding based on feature vectors generated through encoding of the source sentence; adjusting a probability of at least one of the generated words based either one or both of the source word set and the corresponding word set; and selecting character strings from different character strings including each of the generated words based on the adjusted probability and the probability as unadjusted.

The adjusting of the probability may include, in response to a word identified among the generated words being included in the corresponding word set, adjusting a probability of the identified word.

The adjusting of the probability may include, in response to a word identified among the generated words not being included in the corresponding word set, verifying whether a common word is present among other words in a group including the identified word and words in the corresponding word set, and in response to the common word being verified as present and the common word being one of the generated words, adjusting a probability of the common word.

The adjusting of the probability may include identifying a word among the generated words based on a probability of each of the generated words, and adjusting the probability of the identified word, in response to the identified word being included in the corresponding word set.

The performing of the decoding may include calculating a context vector using the feature vectors and weights, and generating the words based on the calculated context vector and a previous decoding result.

The adjusting of the probability may include identifying a source word corresponding to a word having a maximum probability among the generated words based on a maximum value among weights used to perform the decoding, wherein the identified source word is one of words in the source sentence, retrieving a corresponding word of the identified source word from the corresponding word set, in response to the identified source word being included in the source word set; and adjusting a probability of the retrieved corresponding word, in response to the retrieved corresponding word being one of the generated words.

The adjusting of the probability may include, in response to the probability of the retrieved corresponding word being adjusted, identifying a word among the retrieved corresponding word and a remaining word among the generated words excluding the retrieved corresponding word, based on a probability of the remaining word and the adjusted probability of the retrieved corresponding word, and, in response to the identified word being included in the corresponding word set, adjusting a probability of the identified word.

The sentence generating may further include, in response to the selected character strings being candidates for a translated sentence of the source sentence: calculating a score of each of the selected character strings; applying a coverage of each of the selected character strings to the score of a respective one of the selected character strings; and determining one of the selected character strings to be the translated sentence based on a result of the applying of the coverage of each of the selected character strings, wherein the coverage of each of the selected character strings indicates how many words in the corresponding word set are included in each of the selected character strings.

The source word set may include any one or any combination of any two or more of a word extracted from the source sentence, a synonym of the extracted word, and a basic form of the extracted word. The corresponding word set may include any one or any combination of any two or more of a translated word obtained by representing a word in the source word set in another language, a synonym of the translated word, and a basic form of the translated word.

The source sentence and the source word set may be in a first language. The generated words and the corresponding word set may be in a second language different from the first language.

The corresponding word set may be generated using a first language-second language dictionary as a reference.

In another general aspect, a non-transitory computer-readable storage medium stores instructions that, when executed by a processor, cause the processor to perform the sentence generating method described above.

In another general aspect, a sentence generating apparatus includes: a controller configured to generate a corresponding word set of a source word set generated based on a source sentence, generate words by performing decoding based on feature vectors generated through encoding of the source sentence, adjust a probability of at least one of the generated words based on either one or both of the source word set and the corresponding word set, and select character strings from different character strings including each of the generated words based on the adjusted probability and the probability as unadjusted.

The controller may be further configured to adjust a probability of an identified word among the generated words, in response to the identified word being included in the corresponding word set.

The controller may be further configured to verify whether a common word is present among other words in a group including an identified word, among the generated words, and words in the corresponding word set, in response to the identified word not being included in the corresponding word set. The controller may be further configured to adjust a probability of the common word, in response to the common word being verified as present and the common word being one of the generated words.

The controller may be further configured to identify a word among the generated words based on a probability of each of the generated words, and adjust the probability of the identified word, in response to the identified word being included in the corresponding word set.

The controller may be further configured to calculate a context vector using the feature vectors and weights, and generate the words based on the calculated context vector and a previous decoding result.

The controller may be further configured to identify a source word corresponding to a word having a maximum probability among the generated words, based on a maximum value of weights used to perform the decoding, wherein the identified source word is one of words in the source sentence, retrieve a corresponding word of the identified source word from the corresponding word set, in response to the identified source word being included in the source word set, and adjust a probability of the retrieved corresponding word, in response to the retrieved corresponding word being one of the generated words.

The controller may be further configured to identify a word among the retrieved corresponding word and a remaining word among the generated words excluding the retrieved corresponding word, in response to the probability of the retrieved corresponding word being adjusted, based on a probability of the remaining word and the adjusted probability of the retrieved corresponding word. The controller may be further configured to adjust a probability of the identified word, in response to the identified word being included in the corresponding word set.

The controller may be further configured to, in response to the selected character strings being candidates for a translated sentence of the source sentence, calculate a score of each of the selected character strings, apply a coverage of each of the selected character strings to the score of a respective one of the selected character strings, and determine one of the selected character strings to be the translated sentence based on a result of the applying of the coverage of each of the selected character strings, wherein the coverage of each of the selected character strings indicates how many words in the corresponding word set are included in each of the selected character strings.

The source word set may include any one or any combination of any two or more of a word extracted from the source sentence, a synonym of the extracted word, and a basic form of the extracted word. The corresponding word set may include any one or any combination of any two or more of a translated word obtained by representing a word in the source word set in another language, a synonym of the translated word, and a basic form of the translated word.

The source sentence and the source word set may be in a first language. The generated words and the corresponding word set may be in a second language different from the first language.

The corresponding word set may be generated using a first language-second language dictionary as a reference.

Other features and aspects will be apparent from the following detailed description, the drawings, and the claims.

BRIEF DESCRIPTION OF THE DRAWINGS

FIG. 7 is a diagram illustrating an example of an operation to be performed when a translator selects a candidate character string of a translated sentence.

Figure 1:
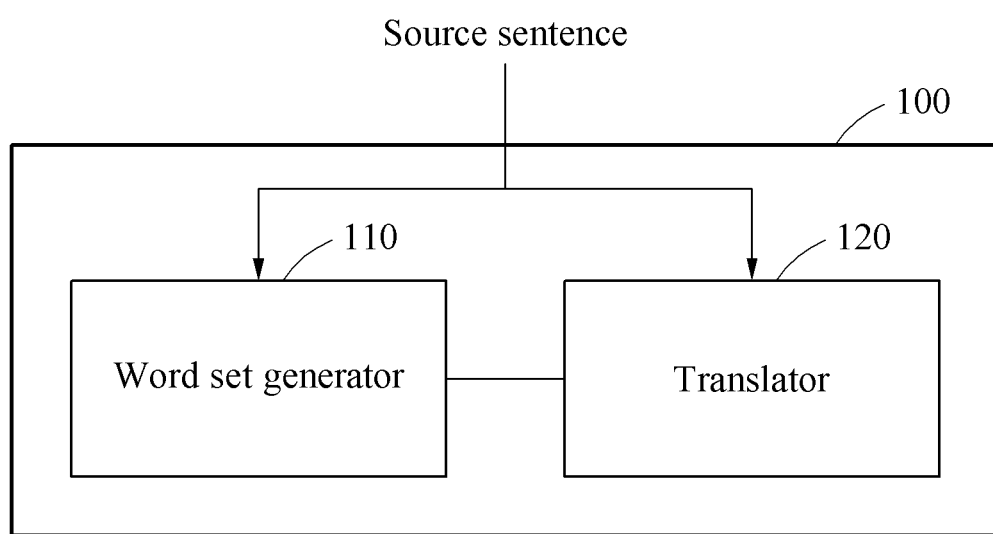
FIG. 1 is a diagram illustrating an example of a sentence generating apparatus.

Throughout the drawings and the detailed description, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Also, in the description of embodiments, detailed description of well-known related structures or functions will be omitted when it is deemed that such description will cause ambiguous interpretation of the disclosure.

The term "word" is used throughout the following description. It is to be understood that the term "word," as used herein, may indicate a single word or a word combination including multiple words that are grouped together.

FIG. 1 is a diagram illustrating an example of a sentence generating apparatus 100.

Referring to FIG. 1, the sentence generating apparatus 100 includes a word set generator 110 and a translator 120.

The word set generator 110 generates a source word set based on a source sentence, and a corresponding word set that corresponds to the source word set. The source word set includes, for example, a word extracted from the source sentence, a synonym of the extracted word, and/or a basic form of the extracted word. The corresponding word set includes, for example, a translated word obtained by representing a word in the source word set in another language, a synonym of the translated word, and/or a basic form of the translated word. The word set generator 110 will be described in further detail with reference to FIG. 2.

The translator 120 generates feature vectors by encoding the source sentence, and generates words by performing decoding based on the feature vectors. The translator 120 increases a probability of at least one of the generated words being included in a character string, based on at least one of the source word set or the corresponding word set. Thus, a probability that at least one of the generated words is included in a character string may increase. The translator 120 may be based on statistical machine translation (SMT) or neural machine translation (NMT). The translator 120 will be described in further detail with reference to FIGS. 3 through 6.

Figure 2:
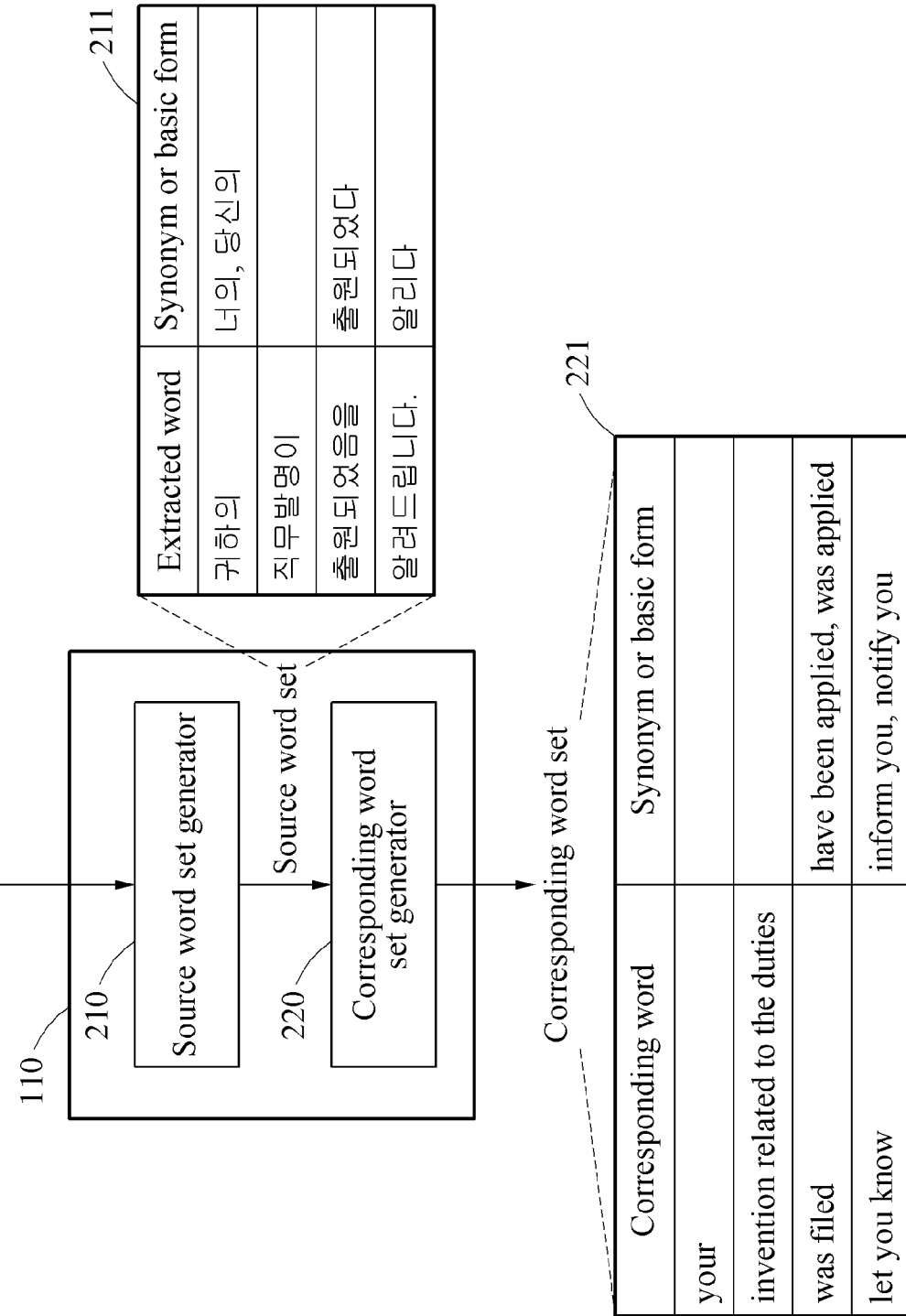
FIG. 2 is a diagram illustrating an example of an operation of a word set generator.

FIG. 2 is a diagram illustrating an example of an operation of the word set generator 110.

Referring to FIG. 2, the word set generator 110 includes a source word set generator 210 and a corresponding word set generator 220.

The source word set generator 210 extracts at least one word from a source sentence, and generates a source word set including the extracted word. For example, the source word set generator 210 extracts a keyword by applying keyword spotting or named-entity recognition to a source sentence in a first language, for example, Korean. According to an example, the source word set generator 210 adds a synonym and/or a basic form of the extracted word to the source word set using a first language dictionary as a reference.

The corresponding word set generator 220 determines a corresponding word that corresponds to a word in the source word set, and generates a corresponding word set including the corresponding word. The corresponding word is, for example, a translated word obtained by representing the word in the source word set in a second language different from the first language, for example, English. The translated word may be generated using, as a reference, a first language-second language dictionary, for example, a Korean-English dictionary. According to an example, the corresponding word set generator 220 adds a synonym and/or a basic form of the corresponding word to the corresponding word set using a second language dictionary as a reference.

For example, as illustrated in FIG. 2, the source word set generator 210 extracts words "귀하의," "직무발명이," "출원되었음을," and "알려드립니다" from a source sentence "귀하의 직무발명이 출원되었음을 알려드립니다." The source word set generator 210 then generates a source word set 211 including the extracted words. The source word set generator 210 adds synonyms "너의" and "당신의" of the word "귀하의" to the source word set 211. In addition, the source word set generator 210 adds a basic form "출원되었다" of the word "출원되었음을" to the source word set 211, and also adds a basic form "알리다" of the word "알려드립니다" to the source word set 211.

The corresponding word set generator 220 determines a corresponding word "your" of the words "귀하의," "너의," and "당신의" in the source word set 211, and a corresponding word "invention related to the duties" of the word "직무발명" in the source word set 211. In addition, the corresponding word set generator 220 determines a corresponding word "was filed" of the words "출원되었음을" and "출원되었다" in the source word set 211, and a corresponding word "let you know" of the words "알려드립니다" and "알리다" in the source word set 211. The corresponding word set generator 220 generates a corresponding word set 221 including the corresponding words "your," "invention related to the duties," "was filed," and "let you know." The corresponding word set generator 220 adds a synonym "have been applied" and/or "was applied" of the corresponding word "was filed" to the corresponding word set 221. In addition, the corresponding word set generator 220 adds a synonym "inform you" and/or "notify you" of the corresponding word "let you know" to the corresponding word set 221.

In an example, a word in the source word set 211 may be ambiguous, and thus the corresponding word set generator 220 may not readily determine a corresponding word of the word. Here, the term "ambiguous" or "ambiguity" indicates that a word may be translated into words having separate meanings. In such an example, the corresponding word set generator 220 may determine the corresponding word of the word using neighboring words of the word as a reference.

For example, in a case of a source sentence "DHL 특송을 보내겠습니다," the source word set generator 210 generates a source word set by extracting words "DHL," "특송," and "보내겠습니다" from the source sentence. In such an example, the word "특송" is translated into "special praise" and "special delivery" that have different meanings, and thus the corresponding word set generator 220 may not readily determine a corresponding word of the word "특송." Thus, the corresponding word set generator 220 determines the corresponding word of the word "특송" to be "special delivery" using a neighboring word "DHL" of the word "특송" as a reference.

FIGS. 3 through 6 are diagrams illustrating examples of operations of a translator 120.

Figure 3:
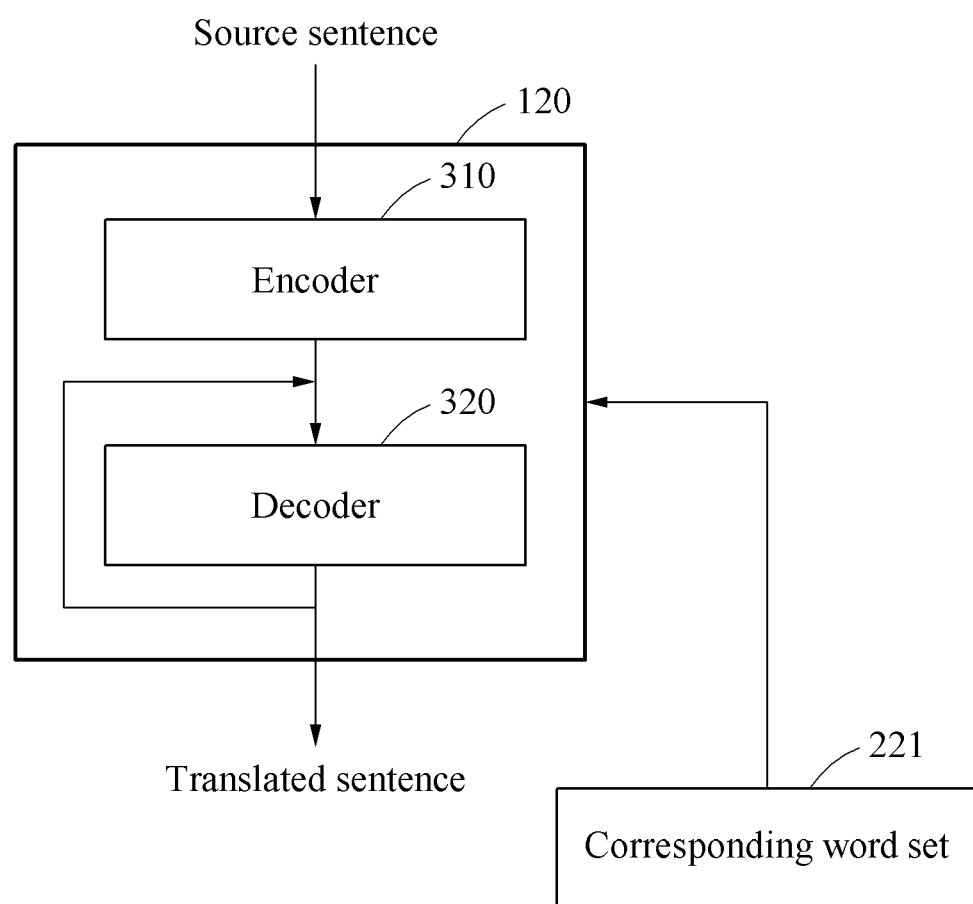
FIGS. 3 through 6 are diagrams illustrating examples of operations of a translator.

Referring to FIG. 3, the translator 120 includes an encoder 310 and a decoder 320.

The encoder 310 encodes a source sentence to generate feature vectors. For example, the encoder 310 encodes each of words in the source sentence to generate a feature vector of each of the words in the source sentence. The generated feature vectors may be real number vectors. According to an example, the encoder 310 is based on a neural network, for example, a recurrent neural network (RNN).

The decoder 320 performs decoding repetitively. The decoder 320 uses feature vectors at each decoding and a previous decoding result to perform decoding. The decoder 320 completes a translated sentence of the source sentence through such a decoding. According to an example, the decoder 320 is based on a neural network, for example, an RNN. An example manner in which the decoder 320 operates at each decoding time will be described hereinafter with reference to FIG. 4.

Figure 4:
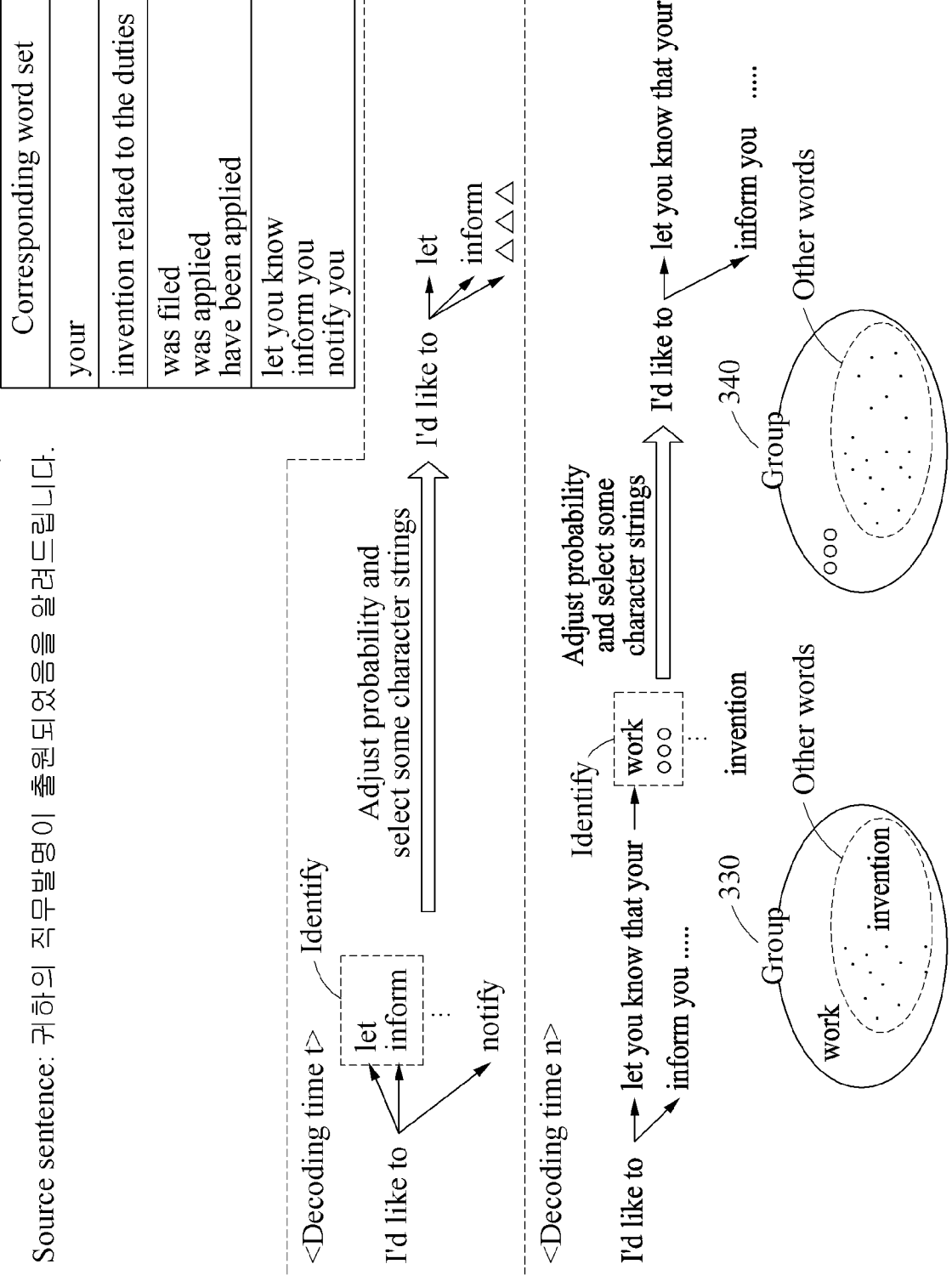

Referring to FIG. 4, at a decoding time t, the decoder 320 performs decoding using feature vectors and a previous decoding result. The decoder 320 generates words "let," "inform," . . . , and "notify" through the decoding. Each of the generated words let," "inform," . . . , and "notify" has a probability. A probability $P_{let}$ of the word "let" is a probability that the word "let" follows a word "to." A probability $P_{inform}$ of the word "inform" is a probability that the word "inform" follows the word "to." A probability $P_{notify}$ of the word "notify" is a probability that the word "notify" follows the word "to." For example, $P_{let}$ being greater than $P_{inform}$ indicates that the word "to" is more likely to be followed by the word "let" than the word "inform."

The decoder 320 identifies a word that satisfies a preset standard among generated words. As illustrated in FIG. 4, the decoder 320 identifies top K words having greater probabilities based on a probability of each of the generated words among the generated words, for example, top two words "let" and "inform."

The decoder 320 verifies whether the identified word is included in a corresponding word set 221. In response to the identified word being included in the corresponding word set 221, the decoder 320 adjusts a probability of the identified word. For example, as illustrated, the decoder 320 verifies whether each of the identified words "let" and "inform" is included in the corresponding word set 221, and verifies that the identified words "let" and "inform" are included in the corresponding word set 221. In such an example, the decoder 320 adjusts the probability $P_{let}$ of the identified word "let" and the probability $P_{inform}$ of the identified word "inform." For example, the decoder 320 adjusts $P_{let}$ by adding a value $\beta_1$ to $P_{let}$, and adjusts $P_{inform}$ by adding a value $\beta_2$ to $P_{inform}$. The values $\beta_1$ and $\beta_2$ used herein may be positive real numbers that are equal to or different from each other.

The decoder 320 selects some character strings from different character strings including each of the generated words, based on the adjusted probability and the unadjusted probability. Here, because there is a word with a probability adjusted to be greater, a character string including such a word may be more likely to be selected than a character string including a word with a probability that is not adjusted. For example, as illustrated in FIG. 4, the decoder 320 performs a beam search on each of different character strings "I'd like to let," "I'd like to inform," . . . , and "I'd like to notify" that include the generated words "let," "inform," . . . , "notify," respectively, to select some character strings. In an example, the decoder 320 calculates a score of each of the character strings "I'd like to let," "I'd like to inform," . . . , and "I'd like to notify," and selects character strings having great scores. The number of character strings to be selected may depend on a size of the beam search. For example, in a case in which the size of the beam search is 3, the decoder 320 selects three character strings based on an order of greater scores. A score of each of the character strings may be a sum obtained by adding probabilities of words included in each of the character strings. For example, a score of the character string "I'd like to let" including the word "let" with the probability adjusted to be greater, and a score of the character string "I'd like to inform" including the word "inform" with the probability adjusted to be greater increase, and thus the character strings "I'd like to let" and "I'd like to inform" are more likely to be selected. For example, as illustrated in FIG. 4, the decoder 320 selects three character strings "I'd like to let," "I'd like to inform," and "I'd like to Δ Δ Δ" having greater scores.

When the character strings are selected, at a decoding time t+1, the decoder 320 generates words that follow the word "let," words that follow the word "inform," and words that follows a word "Δ Δ Δ." The decoder 320 allows the word "let" to be followed by a word "you know" and the word "inform" to be followed by a word "you," which will be described in greater detail hereinafter.

In this example, the word "let" is a portion of "let you know" in the corresponding word set 221, and the word "inform" is a portion of "inform you" in the corresponding word set 221. That is, each of the words "let" and "inform" selected at the decoding time t is a portion of a phrase in the corresponding word set 221. In such a case, the decoder 320 selects the word "you" that follows the word "let" at the decoding time t+1, and selects the word "know" that follows the word "you" at a decoding time t+2, using the phrase "let you know" included in the corresponding word set 221 as a reference. Through such a selecting method, the word "you" is compulsively selected at the decoding time t+1, and the word "know" is also compulsively selected at the decoding time t+2, without increasing a probability $P_{you}$ of the word "you" and a probability $P_{know}$ of the word "know." According to an example, the decoder 320 increases the probability $P_{you}$ to select the word "you" at the decoding time t+1, and increases the probability $P_{know}$ to select the word "know" at the decoding time t+2. Similarly, the decoder 320 selects the word "you" that follows the word "inform" at the decoding time t+1. Thus, the phrases in the corresponding word set 221 may be included in character strings such as "I'd like to let you know" and "I'd like to inform you."

As described above, the decoder 320 identifies a word included in top K words with greater probabilities based on an order of greater probabilities of words generated at a decoding time. When the identified word is included in the corresponding word set 221, the decoder 320 then adjusts a probability of the identified word. However, the identified word may not be included in the corresponding word set 221. In such a case, the decoder 320 verifies whether a common word is present in a group including the identified word and the corresponding word set 221. When the common word is verified as present as a result of the verifying and the common word is one of the words generated at the decoding time, the decoder 320 adjusts a probability of the common word, which will be described hereinafter with reference to a decoding time n as illustrated in FIG. 4.

For example, as illustrated, the decoder 320 performs decoding at the decoding time n based on feature vectors and a previous decoding result, and generates words "work," "ooo," . . . , and "invention." The decoder 320 identifies top K words "work" and "ooo" having greater probabilities among the generated words "work," "ooo," . . . , and "invention." The decoder 320 verifies whether the identified words "work" and "ooo" are included in the corresponding word set 221. Because the identified words "work" and "ooo" are not included in the corresponding word set 221, the decoder 320 verifies whether a common word is present among other words in a group including each of the identified words "work" and "ooo" and words in the corresponding word set 221. The group described herein is a set of words having same or similar meanings or attributes. For example, as illustrated in FIG. 4, the decoder 320 verifies that the word "invention" is a common word among other words in a group 330 including the word "work" and the words in the corresponding word set 221, and also verifies that there is no common word among other words in a group 340 including the word "ooo" and the words in the corresponding word set 221.

The decoder 320 verifies whether the common word "invention" is one of the words generated at the decoding time n, and adjusts a probability $P_{invention}$ of the common word "invention" based on a result of the verifying. For example, as illustrated in FIG. 4, because the common word "invention" is one of the words generated at the decoding time n, the decoder 320 adjusts the probability $P_{invention}$ of the common word "invention" by adding a value to the probability $P_{invention}$ of the common word "invention." Thus, a probability that a character string including the common word "invention" is selected increases.

According to an example, the translator 120 infers a source word corresponding to a word generated at a decoding time. In such a case, the translator 120 verifies whether the source word is included in a source word set 211. When the source word is included in the source word set 211, the translator 120 searches for a corresponding word of the source word from the corresponding word set 221 and adjusts a probability of the retrieved corresponding word, which will be described in greater detail with reference to FIG. 5.

Figure 5:
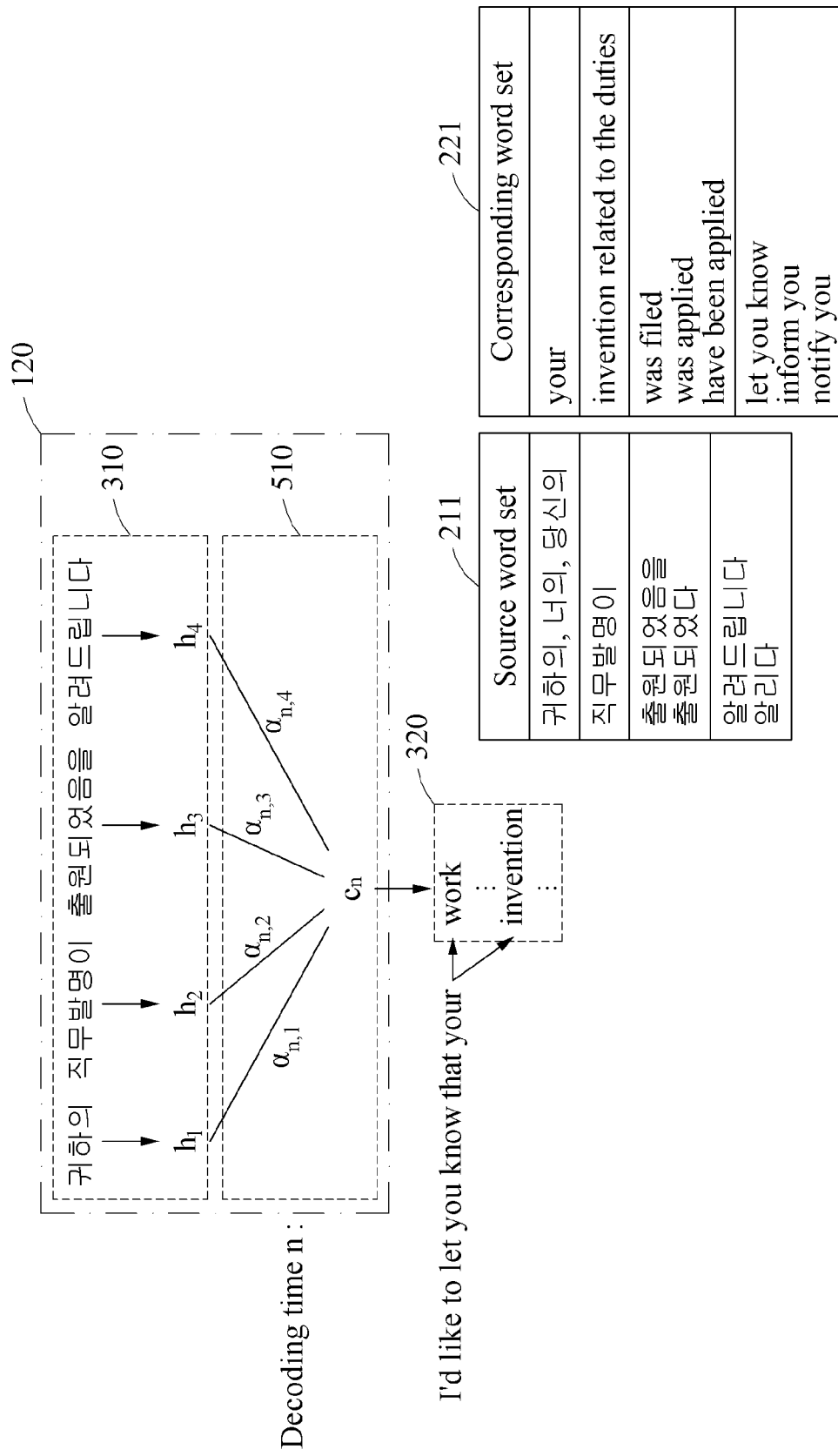

Referring to FIG. 5, the translator 120 includes the encoder 310, a weight calculator 510, and the decoder 320. The translator 120 to be described hereinafter with reference to FIG. 5 may be an attention-based translator.

The encoder 310 encodes a source sentence to generate feature vectors. For example, as illustrated, the encoder 310 encodes a source sentence to generate a feature vector $h_1$ of a word "귀하의," a feature vector $h_2$ of a word "직무발명이," a feature vector $h_3$ of a word "출원되었음을," and a feature vector $h_4$ of a word "알려드립니다."

The weight calculator 510 calculates weights at each decoding time, and the decoder 320 performs decoding at each decoding time. For example, as illustrated, the weight calculator 510 calculates weights $\alpha_{n,1}$, $\alpha_{n,2}$, $\alpha_{n,3}$, and $\alpha_{n,4}$ at a decoding time n based on the feature vectors $h_1$, $h_2$, $h_3$, and $h_4$, and hidden state information of a word "your" at a previous decoding time. The weight calculator 510 calculates a context vector $c_n$ based on the feature vectors $h_1$, $h_2$, $h_3$, and $h_4$, and the weights $\alpha_{n,1}$, $\alpha_{n,2}$, $\alpha_{n,3}$, and $\alpha_{n,4}$. The decoder 320 performs decoding based on the context vector $c_n$ to generate words "work," . . . , "invention."

When the words "work," . . . , "invention" are generated, the decoder 320 identifies a source word corresponding a word having a maximum probability based on a maximum weight. That is, based on a maximum value among the weights, the decoder 320 identifies the source word that makes a greatest contribution to generating the word having the maximum probability. The source word is one of words in the source sentence. As illustrated in FIG. 5, when the weight $\alpha_{n,2}$ is the maximum weight among the weights $\alpha_{n,1}$, $\alpha_{n,2}$, $\alpha_{n,3}$, and $\alpha_{n,4}$, the decoder 320 verifies that the weight $\alpha_{n,2}$ is associated with the feature vector $h_2$, and identifies the word "직무발명" of the feature vector $h_2$ as a source word corresponding to the word "work."

The decoder 320 verifies whether the identified source word is included in a source word set 211. When the identified source word is included in the source word set 211, the decoder 320 searches for a corresponding word of the identified source word from a corresponding word set 221. When the retrieved corresponding word is generated at the decoding time n, the decoder 320 adjusts a probability of the retrieved corresponding word. According to an example, a phrase is retrieved from the corresponding word set 221. In such a case, when a word in the phrase is generated, the decoder 320 adjusts a probability of the word in the phrase. For example, as illustrated in FIG. 5, the decoder 320 verifies whether the identified word "직무발명" is included in the source word set 211. Because the identified word "직무발명" is included in the source word set 211, the decoder 320 searches for a corresponding word "invention related to the duties" of the identified word "직무발명" from the corresponding word set 221. The retrieved corresponding word "invention related to the duties" is a phrase. Thus, the decoder 320 verifies whether a first word "invention" of the retrieved corresponding word "invention related to the duties" is generated at the decoding time n. Because the word "invention" is generated at the decoding time n, the decoder 320 adjusts a probability $P_{invention}$ of the word "invention" by adding $w_1$ to the probability $P_{invention}$. In this example, $w_1$ is a positive real number. However, when the word "invention" is not generated at the decoding time n, the decoder 320 adjusts a probability of the word "work" having a maximum probability.

The decoder 320 selects some character strings from different character strings including each of the generated words based on the adjusted probability and the unadjusted probability. For example, the decoder 320 selects character strings by performing a beam search. The selecting of character strings has been described above with reference to FIG. 4, and thus a more detailed and repeated description is omitted here for clarity and brevity.

In an example, before selecting the character strings after adjusting the probability $P_{invention}$ of the word "invention" to be $P_{invention}+w_1$, the decoder 320 adjusts a probability as described above with reference to FIG. 4, which will be described in greater detail with reference to FIG. 6.

Figure 6:
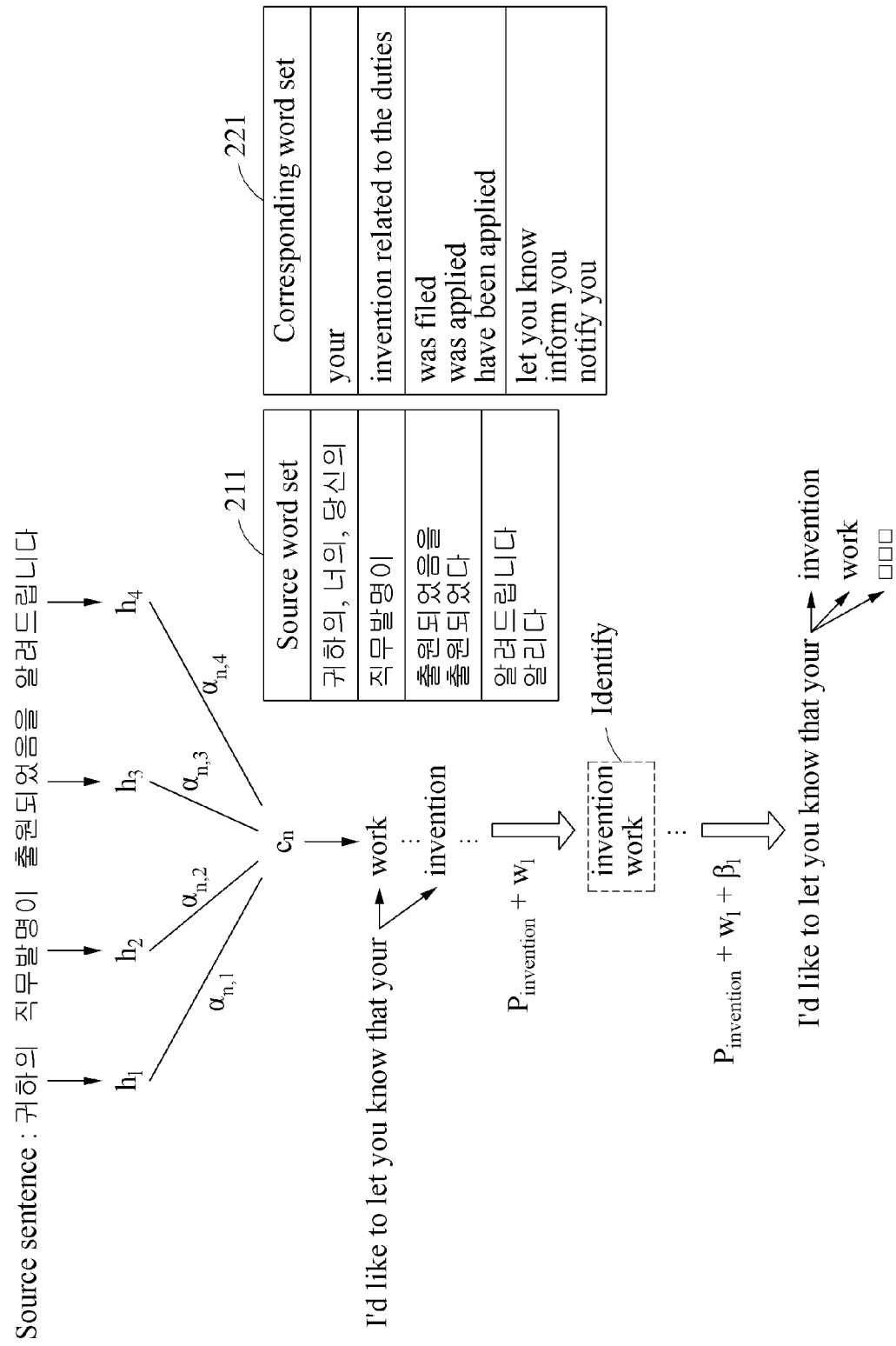

Referring to FIG. 6, when the probability $P_{invention}$ is adjusted to be $P_{invention}+w_1$, the word "invention" is included in top K words based on an order of greater probabilities. The decoder 320 identifies words "invention" and "work" as the top K words.

The decoder 320 verifies whether each of the identified words "invention" and "work" is included in a corresponding word set 221. As illustrated in FIG. 6, the identified word "invention" is included in the corresponding word set 221, and the identified word "work" is not included in the corresponding word set 221. In such a case, the decoder 320 adds $\beta_1$ to the probability $P_{invention}+w_1$ of the identified word "invention," and thus the probability $P_{invention}$ of the word "invention" increases by $w_1+\beta_1$ from when the probability $P_{invention}$ is calculated through decoding. Thus, a probability that a character string including the word "invention" is selected further increases.

FIG. 7 is a diagram illustrating an example of an operation to be performed when a translator selects a candidate character string of a translated sentence.

Referring to FIG. 7, the translator 120 selects character strings in Table 1 below to be candidate character strings of a translated sentence of a source sentence "귀하의 직무발명이 출원되었음을 알려드립니다."

TABLE 1

First candidate character string: I'd like to let you know that your invention related to the duties was filed.
Second candidate character string: I'd like to inform you that your work have been applied.
Third candidate character string: I'd like to let you know that your work has been set out.

The translator 120 calculates a score of each of the candidate character strings. For example, in a case of the first candidate character string, the translator 120 calculates a score $S_1$ of the first candidate character string by adding a probability of "I'd," a probability of "let" (or a probability of "let you know") and a probability of "was field." Similarly, the translator 120 calculates scores $S_2$ and $S_3$ of the second candidate character string and the third candidate character string, respectively.

The translator 120 selects, to be a final sentence, a candidate character string having a greatest score among the calculated scores. For example, when $S_1$=0.7, $S_2$=0.6, and $S_3$=0.55, the translator 120 may select the first candidate character string to be the final sentence because $S_1$ is greatest among the scores.

In an example, the translator 120 applies a coverage of each of the candidate character strings to a score of each of the candidate character strings, and selects one of the candidate character strings to be the translated sentence of the source sentence based on a result of the applying of the coverage. The coverage described herein indicates how many words in a corresponding word set are covered or included in each of the candidate character strings. A synonym or a basic form of each of the words in the corresponding word set may also be a target to be covered.

As illustrated in FIG. 7, the first candidate character string includes or covers "your" of a coverage target 710, "invention related to the duties" of a coverage target 720, "was filed" of a coverage target 730, and "let you know" of a coverage target 740, among the words in the corresponding word set 221. In such a case, the translator 120 determines that the first candidate character string includes or covers all the four coverage targets 710 through 740.

The second candidate character string includes or covers "your" of the coverage target 710, "have been applied" of the coverage target 730, and "inform you" of the coverage target 740 among the words in the corresponding word set 221. In such a case, the translator 120 determines that the second candidate character string includes or covers three of the four coverage targets 710 through 740.

The third candidate character string includes or covers "your" of the coverage target 710 and "let you know" of the coverage target 740 among the words in the corresponding word set 221. In such a case, the translator 120 determines that the third candidate character string includes or covers two of the four coverage targets 710 through 740.

The translator 120 applies the coverage of each of the candidate character strings to the score of each of the candidate character strings. For example, the first candidate character string includes or covers four of the four coverage targets 710 through 740, and thus the translator 120 applies $C_1$=4/4=1 to $S_1$. The second candidate character string includes or covers three of the four coverage targets 710 through 740, and thus the translator 120 applies $C_2$=3/4 to $S_2$. Similarly, the third candidate character string includes or covers two of the four coverage targets 710 through 740, and thus the translator 120 applies $C_3$=2/4 to $S_3$.

The translator 120 selects one of the candidate character strings to be the translated sentence based on a result of applying each coverage to each score. For example, when the result is $S_1C_1$=0.7, $S_2C_2$=0.6×3/4=0.45, and $S_3C_3$=0.55×2/4=0.275, the translator 120 selects the first candidate character string having SIC, to be the translated sentence because $S_1C_1$, is greatest in the result. As described, a candidate character string with a high or great coverage of the corresponding word set 221 is selected to be the translated sentence, and thus a main keyword may not be omitted from the translated sentence. Therefore, a translation performance is improved.

In an example, the translator 120 uses a previously determined coverage to process another source sentence, and thus prevents an already covered word from appearing repeatedly in a translated sentence of the other source sentence. For example, when the translator 120 translates a source sentence "귀하의 직무발명이 출원되었음을 알려드립니다" into "I'd like to let you know that your invention related to the duties was field," the translated sentence above includes or covers "let you know." In this case, when the translator 120 generates "let you know" during machine translation being performed on another source sentence "~를 알려드립니다," the translator 120 reduces a probability of "let you know." Thus, "let you know" may not be included in a result of translating the other source sentence, and "let you know" may not appear redundantly.

Figure 8:
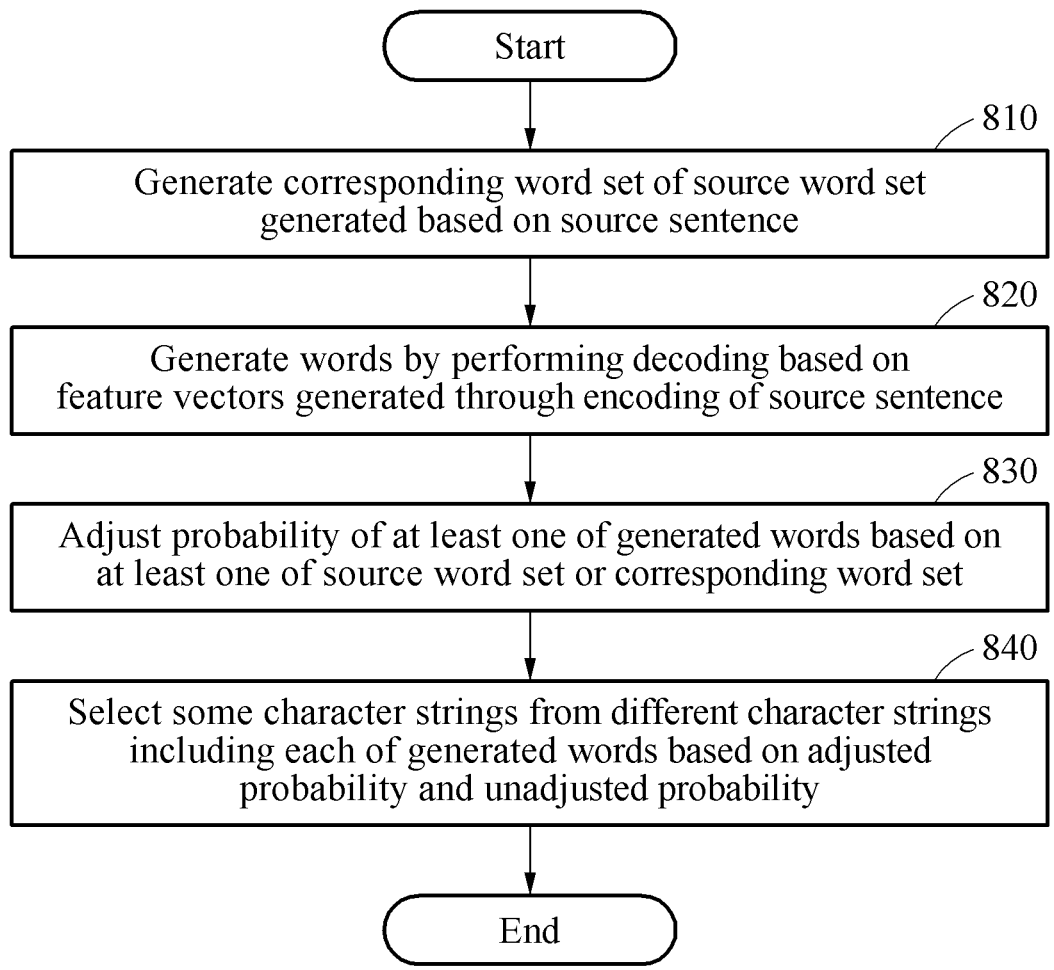
FIG. 8 is a flowchart illustrating an example of a sentence generating method.

FIG. 8 is a flowchart illustrating an example of a sentence generating method. The sentence generating method of FIG. 8 to be described hereinafter with reference to FIG. 8 may be performed by the sentence generating apparatus 100.

Referring to FIG. 8, in operation 810, the sentence generating apparatus 100 generates a corresponding word set of a source word set generated based on a source sentence.

In operation 820, the sentence generating apparatus 100 generates words by performing decoding based on feature vectors generated through encoding of the source sentence.

In operation 830, the sentence generating apparatus 100 adjusts a probability of at least one of the generated words based on either one or both of the source word set and the corresponding word set.

In operation 840, the sentence generating apparatus 100 selects some character strings from different character strings including each of the generated words based on the adjusted probability and the unadjusted probability.

The descriptions provided with reference to FIGS. 1 through 7 may be applicable to the operations described above with reference to FIG. 8, and thus a more detailed and repeated description is omitted here for clarity and brevity.

Figure 9:
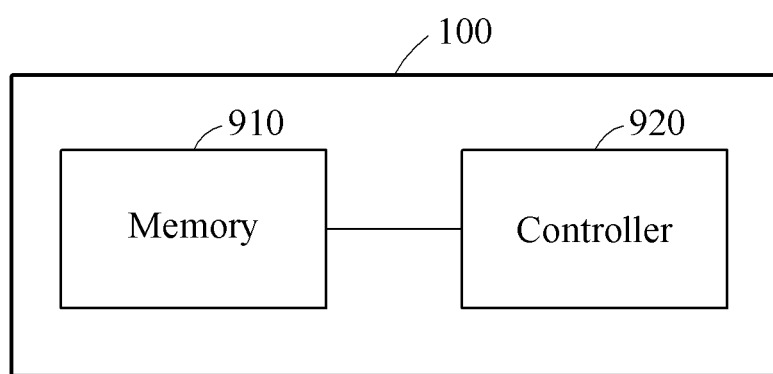
FIG. 9 is a diagram illustrating a further example of the sentence generating apparatus.

FIG. 9 is a diagram illustrating a further example of the sentence generating apparatus 100.

Referring to FIG. 9, the sentence generating apparatus 100 includes a memory 910 and a controller 920.

The memory 910 stores a source sentence, and a result of an operation performed by the controller 920.

The controller 920 may be embodied by the word set generator 110 and the translator 120 described above, and shown in FIG. 1.

In an example, the controller 920 generates a corresponding word set of a source word set generated based on the source sentence. The controller 920 generates words by performing decoding based on feature vectors generated through encoding of the source sentence. The controller 920 adjusts a probability of at least one of the generated words based on either one or both of the source word set and the corresponding word set. The controller 920 selects character strings from different character strings including each of the generated words based on the adjusted probability and the unadjusted probability.

The sentence generating apparatus 100 performs the decoding based on the source word set and/or the corresponding word set, and thus effectively expands a range of character strings to be retrieved in the decoding.

The descriptions provided with reference to FIGS. 1 through 7 may be applicable hereto, and thus a more detailed and repeated description is omitted here for clarity and brevity.

The sentence generating apparatus 100, the word set generator 110, and the translator 120 in FIG. 1, the word set generator 110, the source word set generator 210, and the corresponding word set generator 220 in FIG. 2, the translator 120, the encoder 310, and the decoder 320 in FIG. 3, and sentence generating apparatus 100, the memory 910, and the controller 920 in FIG. 9 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2 and 4 through 8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A machine translation method, comprising:
generating, by at least one processor, a corresponding word set of a source word set generated based on a source sentence, wherein the source sentence and the source word set are in a first language and the corresponding word set is in a second language;
generating, by the at least one processor, words in the second language based on the source sentence;
adjusting, by the at least one processor, a probability of a first word among the generated words in response to the first word being included in the corresponding word set;
calculating a score of a first character string including the first word based on the adjusted probability;
calculating, by the at least one processor, a score of each of second character strings including each of remaining generated words excluding the first word based on a probability of each of the remaining generated words;
selecting, by the at least one processor, top K character strings from the first character string including the first word and the second character strings based on an order of the calculated score of first character string including the first word and the calculated score of each of the second character strings the selected tog K character strings having greater scores than non-selected character strings from the first character string and the second character strings; and
generating, by the at least one processor, a translated sentence of the source sentence based on the selected top K character strings.

2. The machine translation method of claim 1, wherein the adjusting of the probability comprises increasing the probability of the first word.

3. The machine translation method of claim 1, further comprising, in response to the first word not being included in the corresponding word set,
verifying whether a common word is present among words in the corresponding word set and other words in a group including the first word; and
in response to the common word being verified as present and the common word being one of the generated words, adjusting a probability of the common word.

4. The machine translation method of claim 1, wherein the generating of the words comprises
generating feature vectors through encoding of the source sentence; and
generating the words by performing decoding based on the feature vectors.

5. The machine translation method of claim 4, wherein the performing of the decoding comprises
calculating a context vector using the feature vectors and weights; and
generating the words using the calculated context vector and a previous decoding result.

6. The machine translation method of claim 1, wherein
the source word set comprises any one or any combination of any two or more of a word extracted from the source sentence, a synonym of the extracted word, and a basic form of the extracted word, and
the corresponding word set comprises any one or any combination of any two or more of a translated word obtained by representing a word in the source word set in the second language, a synonym of the translated word, and a basic form of the translated word.

7. A machine translation method, comprising:
generating, by at least one processor, a corresponding word set of a source word set generated based on a source sentence, wherein the source sentence and the source word set are in a first language and the corresponding word set is in a second language;
generating, by the at least one processor, candidate character strings in the second language based on the source sentence;
determining, by the at least one processor, how many words in the corresponding word set are included in each of the candidate character strings;
adjusting, by the at least one processor, a score of at least one of the candidate character strings based on a result of the determining;
determining, by the at least one processor, a target character string from the candidate character strings as a translated sentence of the source sentence based on a result of the adjusting; and
generating, by the at least one processor, the translated sentence.

8. The machine translation method of claim 7, wherein the determining of how many words in the corresponding word set are included in each of the candidate character strings comprises
calculating a number of common words between the corresponding word set and each of the candidate character strings.

9. The machine translation method of claim 8, wherein the adjusting of the score comprises adjusting the score of at least one of the candidate character strings using the calculated number of common words.

10. The machine translation method of claim 7, wherein the generating of the candidate character strings comprises:
generating feature vectors through encoding of the source sentence; and
generating the candidate character strings by performing decoding based on the feature vectors.

11. The machine translation method of claim 7, wherein
the source word set comprises any one or any combination of any two or more of a word extracted from the source sentence, a synonym of the extracted word, and a basic form of the extracted word, and the corresponding word set comprises any one or any combination of any two or more of a translated word obtained by representing a word in the source word set in the second language, a synonym of the translated word, and a basic form of the translated word.

12. A machine translation apparatus, comprising:

a processor configured to:

generate a corresponding word set of a source word set generated based on a source sentence, wherein the source sentence and the source word set are in a first language and the corresponding word set is in a second language;

generate words in the second language based on the source sentence;

adjust a probability of a first word among the generated words in response to the first word being included in the corresponding word set;

calculate a score of a first character string including the first word based on the adjusted probability;

calculate a score of each of second character strings including each of remaining generated words excluding the first word based on a probability of each of the remaining generated words;

select top K character strings from the first character string including the first word and the second character strings based on an order of the calculated score of the character string including the first word and the calculated score of each of the other character strings, the selected too K character strings having greater scores than non-selected character strings from the first character string and the second character strings; and generate a translated sentence of the source sentence based on the selected top K character strings.

13. The machine translation apparatus of claim 12, wherein the processor is further configured to increase the probability of the first word.

14. The machine translation apparatus of claim 12, wherein the processor is further configured to, in response to the first word not being included in the corresponding word set, verify whether a common word is present among words in the corresponding word set and other words in a group including the first word, and in response to the common word being verified as present and the common word being one of the generated words, adjust a probability of the common word.

15. The machine translation apparatus of claim 12, wherein the processor is further configured to generate feature vectors through encoding of the source sentence, and generate the words by performing decoding based on the feature vectors.

16. The machine translation apparatus of claim 15, wherein the processor is further configured to calculate a context vector using the feature vectors and weights, and generate the words using the calculated context vector and a previous decoding result.

17. The machine translation apparatus of claim 12, wherein the source word set comprises any one or any combination of any two or more of a word extracted from the source sentence, a synonym of the extracted word, and a basic form of the extracted word, and the corresponding word set comprises any one or any combination of any two or more of a translated word obtained by representing a word in the source word set in the second language, a synonym of the translated word, and a basic form of the translated word.

18. A machine translation apparatus, comprising:

a processor configured to:

generate a corresponding word set of a source word set generated based on a source sentence, wherein the source sentence and the source word set are in a first language and the corresponding word set is in a second language;

generate candidate character strings in the second language based on the source sentence;

determine how many words in the corresponding word set are included in each of the candidate character strings;

adjust a score of at least one of the candidate character strings based on a result of the determining;

determine a target character string from the candidate character strings as a translated sentence of the source sentence based on a result of the adjusting; and generate the translated sentence.

19. The machine translation apparatus of claim 18, wherein the processor is further configured to calculate a number of common words between the corresponding word set and each of the candidate character strings, and determine a coverage of each of the candidate character strings based on the calculated number of common words.

20. The machine translation apparatus of claim 19, wherein the processor is further configured to adjust the score of at least one of the candidate character strings using the calculated number of common words.

21. The machine translation apparatus of claim 18, wherein the processor is further configured to generate feature vectors through encoding of the source sentence, and generate the candidate character strings by performing decoding based on the feature vectors.

22. The machine translation apparatus of claim 18, wherein the source word set comprises any one or any combination of any two or more of a word extracted from the source sentence, a synonym of the extracted word, and a basic form of the extracted word, and the corresponding word set comprises any one or any combination of any two or more of a translated word obtained by representing a word in the source word set in the second language, a synonym of the translated word, and a basic form of the translated word.

\* \* \* \* \*